(12) United States Patent
Proffit et al.

(10) Patent No.: US 8,612,450 B1
(45) Date of Patent: Dec. 17, 2013

(54) CONTENT TAGGING USING MULTI-NODE HIERARCHICAL CONTENT ASSIGNMENTS

(71) Applicant: Limelight Networks, Inc., Tempe, AZ (US)

(72) Inventors: Spencer Proffit, Vashon, WA (US); Ahmed Badran, Issaquah, WA (US); Soam Acharya, San Bruno, CA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/682,532

(22) Filed: Nov. 20, 2012

(51) Int. Cl.
G06F 7/00 (2006.01)
G06F 17/30 (2006.01)

(52) U.S. Cl.
USPC .......................... 707/740; 707/749; 707/755

(58) Field of Classification Search
None
See application file for complete search history.

(56) References Cited

U.S. PATENT DOCUMENTS

| | | |
|---|---|---|
| 7,752,073 B2 | 7/2010 | Barry et al. |
| 2002/0083468 A1 * | 6/2002 | Dudkiewicz .................. 725/133 |
| 2010/0217869 A1 | 8/2010 | Esteban et al. |
| 2010/0312861 A1 | 12/2010 | Kolhi et al. |
| 2012/0072526 A1 | 3/2012 | Kling et al. |
| 2012/0139932 A1 | 6/2012 | Sakamoto |
| 2012/0198070 A1 * | 8/2012 | Black et al. .................. 709/226 |
| 2012/0198071 A1 * | 8/2012 | Black et al. .................. 709/226 |
| 2013/0091207 A1 * | 4/2013 | Diab .............................. 709/204 |

OTHER PUBLICATIONS

Pogacnik et al., "Personal Content Recommender Based on a Hierarchical User Model for the Selection of TV Programmes", User Modeling and User-Adapted Interaction, pp. 425-457, Springer, 2005.*
Sotelo et al., "TV Program Recommendation for Groups based on Muldimensional TV-Anytime Classifications", IEEE Transactions on Consumer Electronics, vol. 55, No. 1, pp. 248-256, IEEE, Feb. 2009.*
A. Markov et al., "The Hybrid Representation Model for Web Document Classification" from http://www.ise.bgu.ac.il/faculty/mlast/papers/Markov_IJIS_Final.pdf, vol. 23 Issue 6, Jun. 2008.
Ankur Satyendrakumar Sharma et al., "Classification of Multi-Media Content (Video's on YouTube) Using Tags and Focal Points" from http://www-users.cs.umn.edu/~ankur/FinalReport_PR-1.pdf.
Lei Tang et al., "Acclimatizing Taxonomic Semantics for Hierarchical Content Classification" from http://citeseerx.ist.psu.edu/viewdoc/download?doi=10.1.1.68.7247&rep=rep1&type=pdf, 2006.

* cited by examiner

*Primary Examiner* — Michael Hicks
(74) *Attorney, Agent, or Firm* — Kilpatrick Townsend & Stockton LLP

(57) ABSTRACT

Methods and systems generate content-categorization hierarchies and assign each content object to a set of nodes in the hierarchies. Each hierarchy includes a series of levels, each level including nodes which represent a categorization. A node in a top level is connected with multiple nodes in a lower level via a direct path. Each content object is assigned to a set of nodes, such that assignment to a lower-level node also results in assignment to each higher-level node in the lower-level node's direct path to a top of the hierarchy. Metadata of the content object is then modified to include a set of tags, each tag being a term from an assigned node. Tags are used to categorize the content object, summarize of the content object, identify recommended content objects, identify content objects responsive to a search query, and/or identify other content objects to supplement the content object.

20 Claims, 9 Drawing Sheets

CONTENT TAGGING USING MULTI-NODE HIERARCHICAL CONTENT ASSIGNMENTS

BACKGROUND

This disclosure relates in general to assigning a content objects to multiple nodes in a hierarchy and to performing characterizations of or searches for content using the assignments and hierarchy.

Characterization of content objects can assist in predicting content objects of interest to a user. For example, the characterization can be used to suggest content objects within a category of interest to a user or to identify content objects responsive to a user's search. However, the utility of the characterization depends on how the characterization is performed in the first place. The characterization can be difficult because different users can use different terms to search for a same content object.

SUMMARY

In one embodiment, the present disclosure provides a method and system for generating one or more content-categorization hierarchies and assigning each content object to a set of nodes in the hierarchy. Each hierarchy includes a series of levels, with each level including one or more nodes which represent a categorization. A node in a top level is connected with multiple nodes in a lower level via a direct path (the direct path not requiring path inflections to connect the nodes). For example, a $1^{st}$-level node can include a "sports" node, which is connected to three $2^{nd}$-level nodes ("baseball", "football" and "soccer"). Each content object is assigned to a set of nodes, such that assignment to a lower-level node also results in assignment to each higher-level node in the lower-level node's direct path to a top of the hierarchy. Metadata of the content object is then modified to include a set of tags, each tag being a term from an assigned node. The tags can be used to categorize the content object, generate a summary of the content object, identify content objects to recommend to a user, identify content objects responsive to a search query input by a user, and/or identify other content objects to supplement the content object.

In some embodiments, a content delivery system for differentially processing video content objects based on multi-node hierarchy assignments is provided. A hierarchy database includes a hierarchy with a plurality of nodes arranged amongst a plurality of levels. Each node is defined by a node-defining term. Each node in a lower level is connected to another node in a higher level. The node-defining terms increase in specificity throughout a progression from a highest level to a lowest level. A content-object cache stores a plurality of video content object. For each video content object of the plurality of video content objects, a node assigner assigns the video content object to a first node in a respective first level in the hierarchy and assigns the video content object to a second node in the hierarchy. The second node is at a second level. The second level is higher than the first level. The second node is in a direct path of the first node in the hierarchy. The direct path is defined as a shortest path from the first node to the highest level of the hierarchy. For each video content object of the plurality of video content objects, the node assigner further generates metadata tags to characterize the video content object, the metadata tags including a first node-defining term defining the first node and a second node-defining term defining the second node; and stores the metadata tags. A metadata query engine searches, from amongst the plurality of video content objects, for first video content object that are characterized by a query tag. An object-processing engine identifies the query tag based on a processing condition and processes the first video content objects. The first video content objects and second video content objects are not subjected to same processing. The second video content objects includes content objects that are not characterized by the query tag.

In some embodiments, a method for differentially processing video content objects based on multi-node hierarchy assignments is provided. A first video content object is accessed. A hierarchy with a plurality of nodes arranged amongst a plurality of levels is accessed. Each node is defined by a node-defining term. Each node in a lower level is connected to another node in a higher level. The node-defining terms increase in specificity throughout a progression from a highest level to a lowest level. The first video content object is assigned to a first node in a respective first level in the hierarchy. The first video content object is assigned to a second node in the hierarchy based on the assignment to the first node. The second node is at a second level. The second level is higher than the first level. The second node is in a first direct path of the first node in the hierarchy. The first direct path is defined as a shortest path from the first node to the highest level of the hierarchy. First and second metadata tags are generated to characterize the first video content object. The first metadata tag includes a first node-defining term defining the first node, and the second metadata tag includes a second node-defining term defining the second node. The first and second metadata tags are stored. A second video content object is accessed. The second video content object is assigned to a third node in a respective third level in the hierarchy. The third node is different than the first node and different than the second node. The second level is higher than the third level. The second video content object is assigned to the second node in the hierarchy based on the assignment to the third node. The second node is in a second direct path of the third node in the hierarchy. The second direct path is defined as a shortest path from the third node to the highest level of the hierarchy. Third and fourth metadata tags are generated to characterize the second video content object. The third metadata tag includes a third node-defining term defining the third node, and the fourth metadata tag includes the second node-defining term defining the second node. The third and fourth metadata tags are stored. A query tag is identified based on a processing condition. The query tag includes the first node-defining term. A determination is made that the first video content object is characterized by the query tag based on the stored first metadata tag. The first video content object is processed, but the second video content object is not subjected to same processing.

In some embodiments, a method for differentially processing video content objects based on multi-node hierarchy assignments is provided. A set of video content objects is accessed. A hierarchy with a plurality of nodes arranged amongst a plurality of levels is accessed. Each node is defined by a node-defining term. Each node in a lower level is connected to another node in a higher level. The node-defining terms increases in specificity throughout a progression from a highest level to a lowest level. For each video content object of the set of video content objects, the video content object is assigned to a respective first node in the hierarchy and a direct path is identified for the video content object. The direct path is a shortest path from the respective first node to the highest level of the hierarchy. For each video content object of the set of video content objects, the content object is assigned to a respective second node in the direct path and respective first and second metadata tags are generated to characterize the video content object. The respective first metadata tag includes a first node-defining term defining the respective first node, and the respective second metadata tag includes a second node-defining term defining the respective second node. For each video content object of the set of video content objects, the respective first and second metadata tags are stored to indicate that the video content object is characterized by the first and second metadata tags. A query tag is identified based on a processing condition. The query tag includes a node-defining term. A first subset of video content objects is selected from the set of video content objects that are characterized by the query tags. The selection is based on the stored first and second metadata tags. Each video content object of the first subset of video content objects is processed. Each video content object of a second subset of video content objects of the set of video content objects is not subjected to same processing. The first and second subsets are non-overlapping.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides a method and system for generating one or more content-categorization hierarchies and assigning each content object to a set of nodes in the hierarchy. Each hierarchy includes a series of levels, with each level including one or more nodes which represent a categorization. A node in a top level is connected with multiple nodes in a lower level via a direct path (the direct path not requiring path inflections to connect the nodes). For example, a $1^{st}$-level node can include a "sports" node, which is connected to three $2^{nd}$-level nodes ("baseball", "football" and "soccer"). Each content object is assigned to a set of nodes, such that assignment to a lower-level node also results in assignment to each higher-level node in the lower-level node's direct path to a top of the hierarchy. Metadata of the content object is then modified to include a set of tags, each tag being a term from an assigned node. The tags can be used to categorize the content object, generate a summary of the content object, identify content objects to recommend to a user, identify content objects responsive to a search query input by a user, and/or identify other content objects to supplement the content object.

Figure 1:
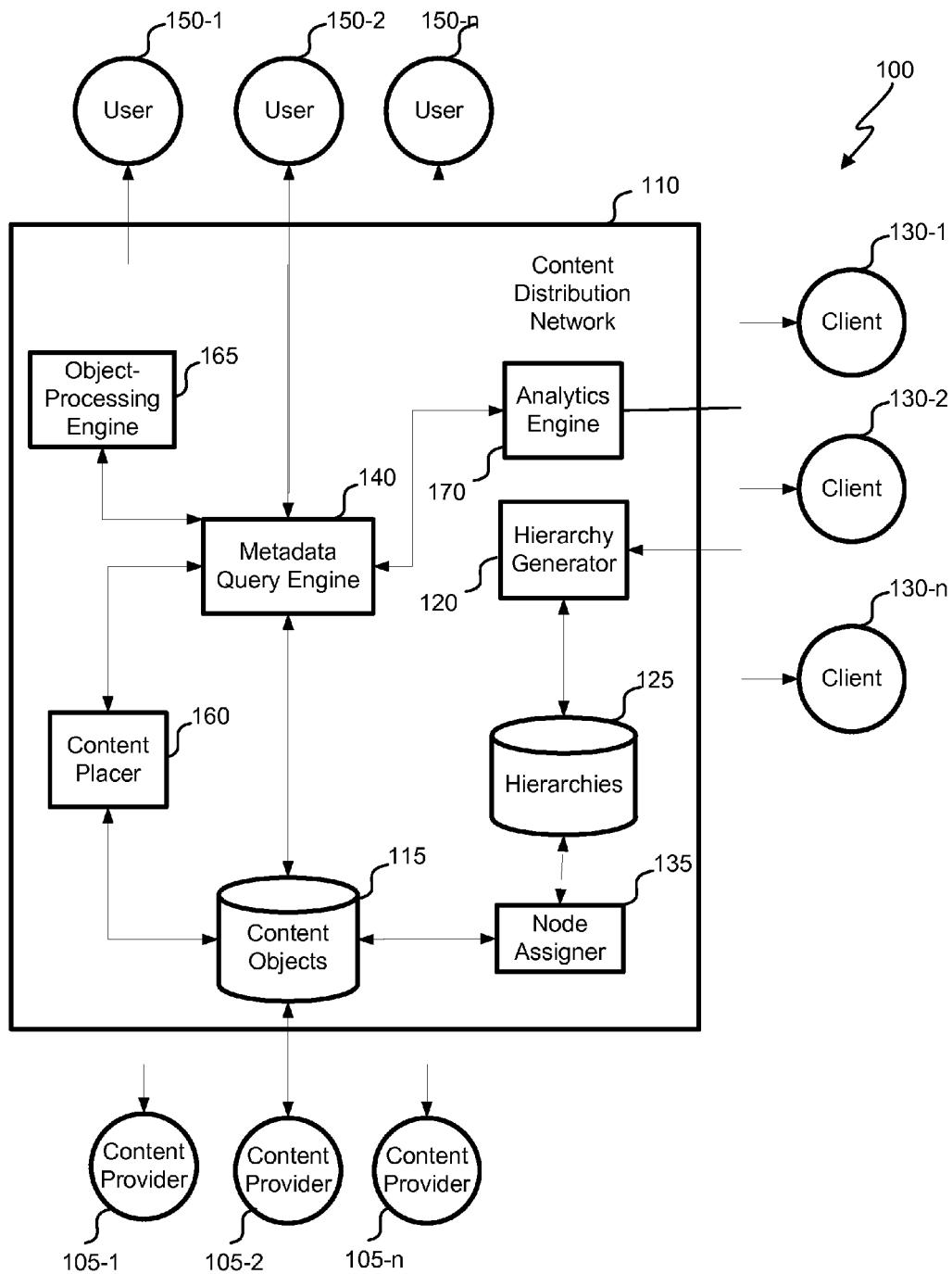
FIG. 1 depicts a block diagram of an embodiment of a content distribution system.

Referring first to FIG. 1, a block diagram of an embodiment of a content distribution system 100 is shown. Each content provider 105 of a set of content providers 105-1, 105-2 . . . 105-n provides one or more content objects to a content distribution network (CDN) 110, which can cache and/or host content. A content object is any content file, content stream or a range defining a segment of a content file or content stream and could include, for example, a media file, video, pictures, data, audio, software, and/or text. The content object could be live, delayed or stored. Throughout the specification, references may be made to a content object, content, content stream and/or content file, but it is to be understood that those terms could be used interchangeably wherever they may appear. In some instances, a content provider 105 provides the content object by retrieving it from an associated origin server outside of the CDN 110.

Content providers 105 can pay for the caching and/or hosting service provided by the CDN 110. Further, content providers 105 can select different types or qualities of service to be provided by the CDN 110 (each of which may be associated with a different fee). For example, services can differ with regard to a geographically disparate degree of caching, processing to be performed, policies to be implemented, types of resources to handle processing and/or types of queries to be handled by the CDN 110.

The CDN can cache the content objects in one or more content-object caches 115. The CDN 110 can, in some instances, include a set of content-object caches 115 distributed amongst a set of points of presence (POPs) 120, which are geographically distributed through the content distribution system 100 to deliver content with lower latency. Various embodiments may have any number of POPs within the CDN 110 that are generally distributed in various locations around the Internet 104 so as to be proximate to end user systems 102. Multiple POPs can use the same IP address such that an Anycast routing scheme is used to find a POP likely to be close to the end user, in a network sense, for each request. The Internet, a wide area network (WAN), a local area network (LAN) 114 and/or other backbone may couple POPs with each other and also couple the POPs with other parts of then CDN 110. Distributed storage, processing and caching can thus be provided by CDN 110.

Figure 2:
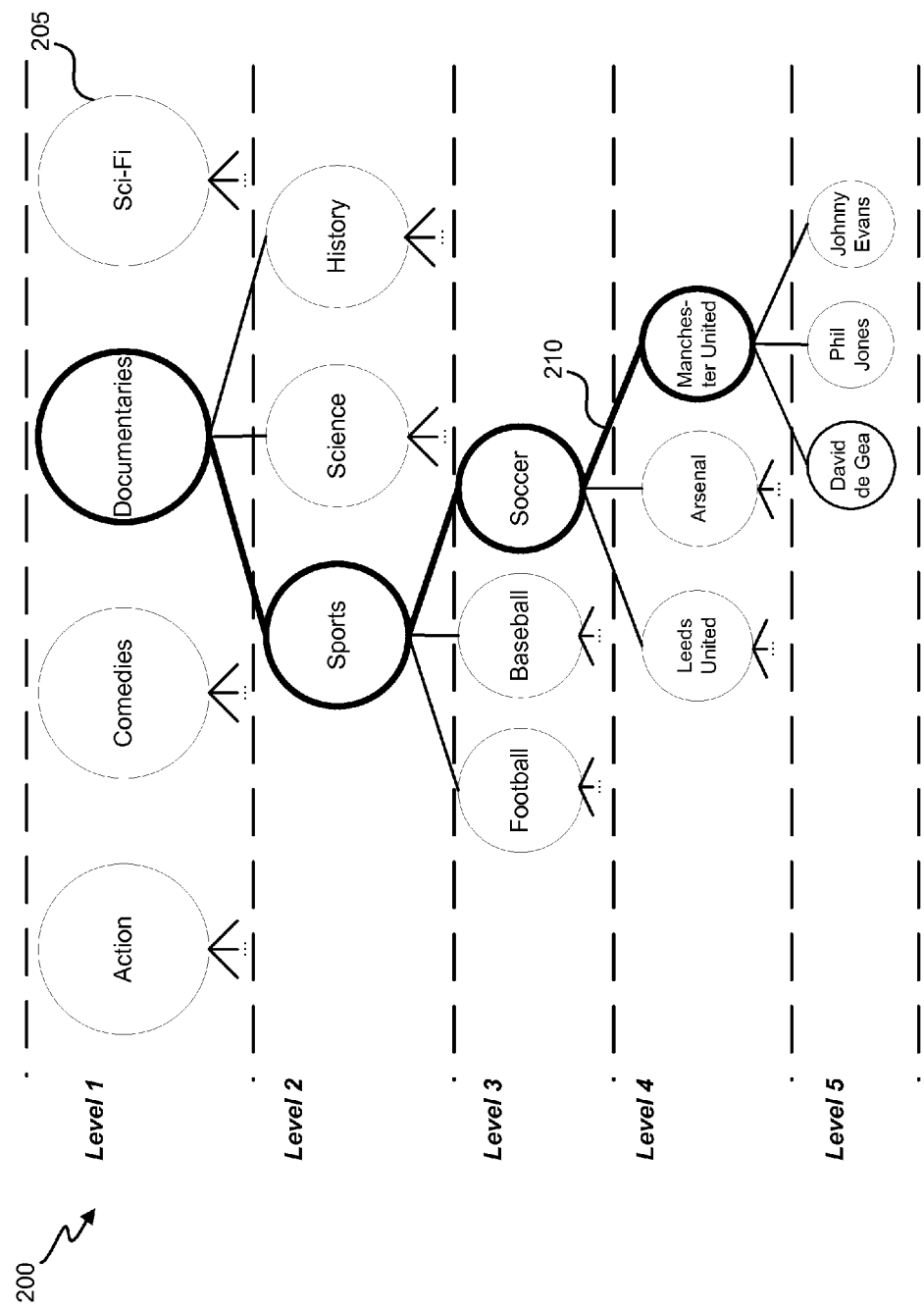
FIG. 2 illustrates an example of a part of a hierarchy used to categorize movies.

The CDN 110 includes a hierarchy generator 120 that generates and/or modifies one or more hierarchies. The hierarchies can include terms in an ontology or otherwise represent an ontology. The hierarchy generator 120 stores the hierarchies in a hierarchy database 125. FIG. 2 shows an example of a part of a hierarchy 200 used to categorize movies. The hierarchy 200 includes a set of nodes 205. Each node 205 can be defined based on one or more terms. A term refers to a word or a set of words. While FIG. 2 shows each node 205 being defined by a single term, in other instances, each node is defined by a set of terms (e.g., synonyms).

Each node 205 is assigned to a level indicative of a degree of generality. Thus, higher levels (e.g., level 1) include node terms more general than do lower levels (e.g., level 5). Nodes in higher levels connect to a plurality of nodes in lower levels. FIG. 2 represents the connections using lines. In FIG. 2, each upper-level node is shown connecting to three lower-level nodes. It will be appreciated that the number of connections may be different than three and/or can vary across higher-level nodes and/or levels.

A hierarchy 200 can be generated based on input from a client 125. The client 130 can use the CDN 110 to provide services to users 150 that allow them to access, search for and/or browse for content objects (e.g., video files, television-show files, and/or music files). In some instances, disclosed embodiments are modified such that a content provider 105 serves as both a content provider 105 and a client 130 (e.g., such that a hierarchy is generated based on input from a content provider 105). For example, the content provider 105 may be using the CDN 110 to syndicate their content, and defining a hierarchy can influence the quality and extent of the syndication.

A client 130 can define a hierarchy, or part of a hierarchy, by identifying which term(s) are to be used to define one or more nodes and/or by identifying which level a node is to be placed at. For example, for a client 130 who only provides streaming sports content, the client 130 can specify that a first level is to specify types of sports; meanwhile, for a client who provides many other types of sports content, the client 130 can specify that such nodes are to reside at a lower level.

In some instances, the hierarchy generator 115 accesses one or more default hierarchies and assigns them to 130 particular client 130. Different or same hierarchies can be made available to different clients 125. For example, different hierarchies can be made available depending on which types of content objects a client 130 intends for the hierarchies to be used for (e.g., a video hierarchy versus a music hierarchy). As another example, a precision of a hierarchy or a number of hierarchies made available to a client 130 can depend on a service plan selected and paid for by the client 130. A default hierarchy can be fixed or can be flexible, such that a client 130 can modify it by, e.g., adding or removing levels, adding or removing nodes and/or modifying node-defining terms.

The hierarchy generator 120 can further assign one or more hierarchies to one or more clients, such as the clients that generated or modified the hierarchy or the clients that subscribed to a level of service at which the hierarchy is available. The assignments can also be stored in the hierarchy database 125.

Returning to FIG. 1, the CDN 110 includes a node assigner 135 that assigns each content object to nodes on hierarchy. Assigning the content object includes assigning it to a first node in the hierarchy and subsequently assigning it to other higher-level nodes. The initial assignment can be based on, e.g., terms in text of the content object, terms in a transcript of the content object, terms in lyrics of the content object and/or terms identified as keywords by a content provider 105 providing the content object.

The node assignment can be reflected in metadata of a content object. For example, the node assigner 135 can generate metadata tags for the content object that include terms defining the nodes to which the content object was assigned. As another example, the node assigner 135 can generate metadata with identifiers of assigned nodes (e.g., Node(1,3), Node(2,5), etc.). The node identifiers can indicate a hierarchy, a level and an intra-level node, such that terms defining the assigned nodes can be easily identified.

In some embodiments, node assignments are binary—a content object is either assigned to a node or it is not. In some instances, node assignments are further characterized by weights. The weights may reflect a separation of a node from an initially assigned node. For example, in FIG. 2, the assignment to the "Manchester United" may have a higher weight than the assignment to the "soccer" node, which may have a higher weight than the assignment to the "sports" node. Thus, if a first content object was specifically about the Manchester United league and a second content object was about soccer in general, a search for a soccer documentary may favor returning the second content object over the first.

FIG. 2 illustrates an example where a content object has been assigned to a level-4 "Manchester United" node. This assignment causes the content object to further be assigned to each upper-level node in a direct path 210 of the defined node. Nodes to which the content object is assigned are shown in bold. The direct path 210 is represented by the thick lines and is defined as a shortest path from a node at issue to a top level of the hierarchy 200.

Returning to FIG. 1, the CDN 110 includes a metadata query engine 140 that searches metadata in the content-object cache 115 to identify content objects with specific tags or node assignments.

As described in further detail below, content objects can be identified in response to receiving input from a user 150 and/or an object identified by the metadata query engine 140 can be presented to a user 150. The user can access the CDN 110 using an end-user system, such as a personal computer, media player, handheld computer, tablet, pad, Internet appliance, phone, smart phone, IPTV set top, streaming radio or any other device that receives and plays content objects. The user can submit enter a request (e.g., searching for a content object) by entering terms into fields of a web site or by selecting links on a web site. The request can be routed to a particular POP (e.g., using the Anycast routing schemed, routing, direction and/or DNS to shunt requests). A switch fabric can assign the request to a specific edge server in a POP (e.g., by choosing an edge server 230 with the least amount of connections, a resource capability and/or the fastest response time and/or by using round robin, load-balancing and/or random methodologies). Each of one or more edge servers can include one or more components of the CDN 110. For example, each edge server can include a metadata query engine 140 and/or a content-object cache 115. Content objects in each edge-server specific cache 115 can be the same or can depend on, e.g., prior use of objects by the edge server. Some components of the CDN 110 (e.g., the hierarchy generator 120, hierarchies 125 and/or node assigner 135) may be centralized and accessible to all edge servers.

In one instance, the search is performed in response to a query submitted by a user 150 A user 150 may enter the query while using a program or service to, e.g., search a database for a particular content object or a content object about a particular subject matter. As another example, a user 150 can indicate that he wishes to be informed when a new content object with particular subject material is available. The metadata query engine 140 can then periodically query the content-object cache 115 to search for tags corresponding to (e.g., being the same as or similar to) the subject matter identified by the user.

In one instance, the search is performed to recommend a content object to a user 150. For example, a user 150 may be viewing, accessing or listening to a content object. Other similar content objects can then be recommended by determining tags of the content object and searching for other content objects with common tags.

In one instance, the search is performed to determine where to present a content object. For example, a content provider 105 may be using the CDN 110 in an attempt to promote access to or viewing of one or more content objects. The metadata query engine 140 can search for other content objects (of a same or different types of the content object provided by the content provider 105) with tags common to one or more tags of the provided content object. In one specific instance of this embodiment, a content provider 105 provides an advertisement content object, and the metadata query engine 140 searches for other content objects in which the advertisement can be placed (e.g., as an inserted video or audio clip or as an overlaid text or image).

In one instance, the search is performed to determine a content object to be presented in or on another content object. For example, a content provider 105 may provide a content object which can accept an advertisement or bonus-material content object. The metadata query engine 140 can search for other content objects (of a same or different types of the content object provided by the content provider 105) with tags common to one or more tags of the provided content object.

In one instance, the search is performed to determine content objects are to be processed. For example, a content provider 105 may have subscribed to a service such that all "comedy" videos are to be transcoded into a set of particular formats, or such that all "sports" videos are to be distributed in high-definition. As another example, a content provider 105 may have indicated that node assignments are to influence where content objects are stored. Objects given different assignments may be cached a different number of times, cached in different geographical regions, cached in resources with different capabilities (e.g., processing power, storage space, and/or available programs or applications) and/or cached in different amounts of the objects (e.g., caching a first subset of objects in their entireties, caching a first percentage or time of a second subset of objects, caching a second percentage or time of a third subset of objects, and not caching a fourth subset of objects). Defining such conditional services may be particularly attractive when a content provider 105 also provides or has access to a hierarchy, such that conditions can be precisely set to meet objectives of the content provider 105. The metadata query engine 140 can search for content objects with the identified tag(s) and may further require that the content objects have been provided by a particular content objects.

In one instance, the search is performed in order to calculate analytics. For example, a content provider 105 request separate analytics for content objects having particular tags (e.g., sports, news, etc.). The metadata query engine 140 can search for content objects with the identified tag(s) and may further require that the content objects have been provided by a particular content objects. The cache 115 can itself include tracking information that can be aggregated across an identified set of content objects, or the results can include mere object identifiers which can be used to identify associated tracking information in another database.

A search conducted by the metadata query engine 140 can involve identifying one or more tags. The tags can include terms in a user's search query, terms derived from a user's search query (e.g., the terms being synonyms to terms in a search query), tags in other content objects (e.g., in which a search-identified content object will be placed or which will be placed in a search-identified content object). The identified tags can be restricted such that only terms in applicable hierarchies are selected are tags. The metadata query engine 140 can then search the metadata of the content objects in the cache 115 for the identified tags.

A result of the search can identify a single content object or a list (e.g., that may be ordered based on predicted interest) of content objects. The results can include all content objects with one of the identified tags, all content objects with a threshold number of the identified tags, or one or a set number of content objects with a highest number of the identified tags. The metadata query engine 140 can calculate a score for each content objects, the score depending whether the content object includes the tag and (in some instances), if so a weight assigned to the tag for the content object. The metadata query engine 140 can then identify results as one or a set number of content objects with the highest scores or content objects with an above-threshold score. Search results can also be identified based on other factors of content objects in the cache 115, such as a popularity, size or length, a service plan paid for by an associated content provider, a quality and/or type.

In instances in which the search is performed in response to a query submitted by a user 150 or to recommend a content object to a user 150, the metadata query engine 140 can identify the search results to the requesting user. The user may then be able to access, download, hear and/or view a search results (e.g., by selecting the result and/or paying for the result).

In instances in which the search is performed to determine a content object placement, a content placer 160 can place a first content object in or on a second content object (one of the two being a search-result-identified content object) or initiate such placement (e.g., by transmitting the first content object to a provider of the second content object and/or generating and transmitting code to support the placement). A provider of one or both objects may be required to approve the placement before the placement occurs. In some instances, a provider of one or both of the objects can select amongst a list of search-result-identified content objects to identify the other object (e.g., resulting in a match between the objects).

In instances in which the search is performed to determine content objects that are to be processed, an object-processing engine 165 can (e.g., automatically) process the search-result-identified content objects. The processed content objects can be cached and provided in response to subsequent requests from users 150. In one instance, object-processing engine 165 thus transmits full or partial copies of the search-result identified content objects to be cached at one or more specific locations or locations of one or more particular types. For example, the content objects may be routed to specific POPs, geographic locations and/or storage components with specific resource capabilities. As one particular illustration, sports video content objects may be assigned to nodes defined by terms identifying specific sports teams. The content objects may then be stored in geographic locations near a respective fan-base region.

In instances in which the search is performed to calculate analytics, an analytics engine 170 can access and aggregate statistics (e.g., number of visitors during a time period) and presented to, e.g., a content provider 105.

Figure 3:
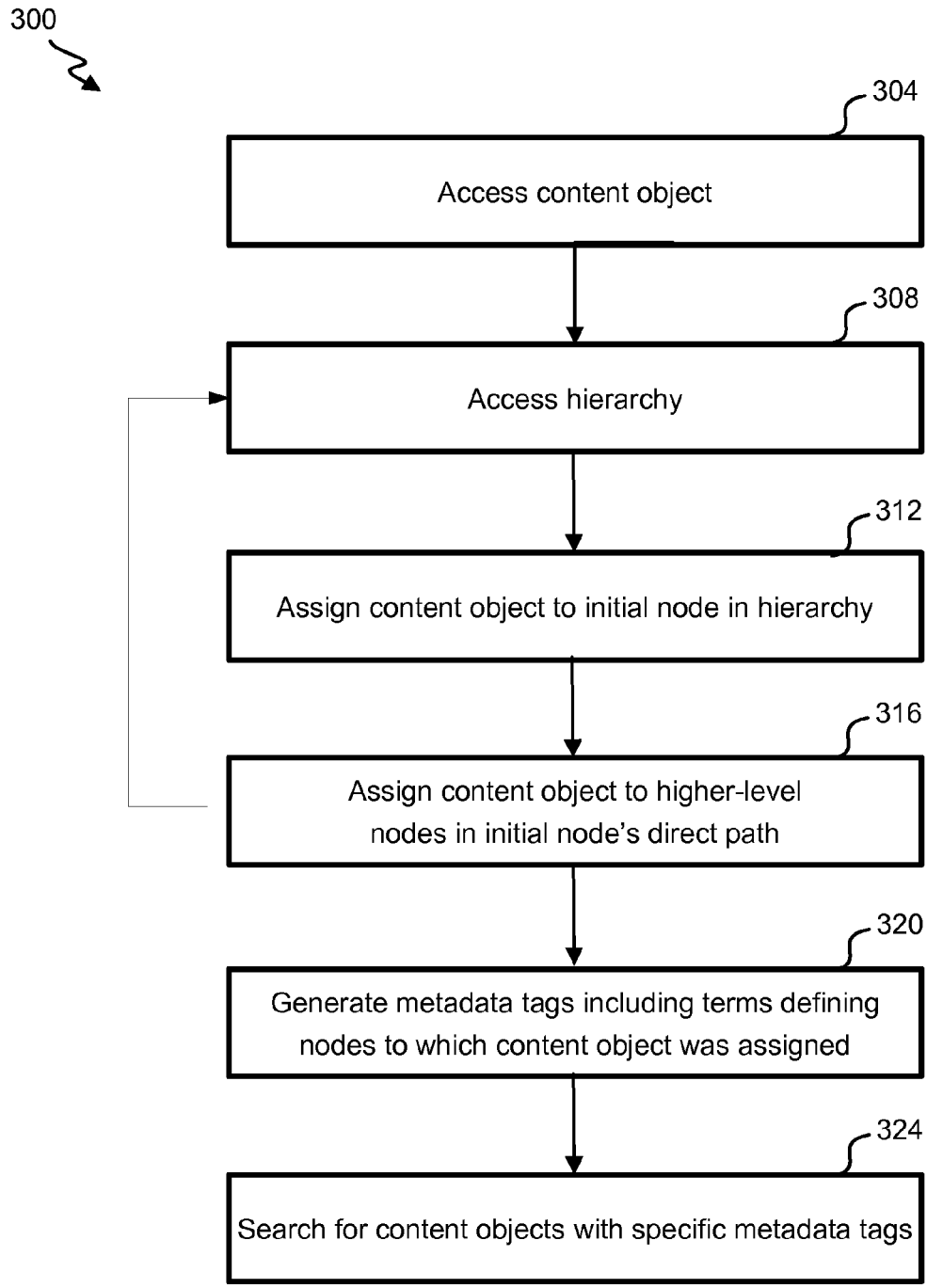
FIG. 3 illustrates a flowchart of an embodiment of a process for categorizing content objects.

With reference to FIG. 3, a flowchart of an embodiment of a process 300 for categorizing content objects is shown. The depicted portion of the process 300 begins in block 304 where the node assigner 135 accesses a content object. For example, a content object can be received from a content provider 105 directly or can be received from a content provider 105, stored in the content-object cache 115 and accessed from the cache 115.

The node assigner accesses a hierarchy (e.g., from the hierarchy database 125) at block 308. The hierarchy can include a default hierarchy, a default hierarchy modified by a client 130 (who may also be a content provider), or a hierarchy generated by a client 130. The hierarchy includes a plurality of nodes, arranged amongst a plurality of levels. Each node is defined by a term. Which hierarchy is accessed (in instances in which multiple hierarchies are available) can depend on a content provider that provided the accessed content object, a property of the content object (e.g., a type of file), a client 130 for which the categorizing is being performed and/or a reason why the content object is being categorized.

The node assigner 135 assigns the accessed content object to an initial node in the accessed hierarchy at block 312. The assignment can be based on, e.g., terms in text of the content object, terms in a transcript of the content object, terms in lyrics of the content object and/or terms identified as keywords by a content provider 105 providing the content object. In some instances, the initial node can be defined with an identified term (e.g., occurring in a content object, in a transcript, in lyrics, or in keywords) at a frequency above an absolute threshold or a relative threshold (e.g., relative to a cross-object frequency of a term). In other instances, after identifying terms characterizing the content object, an ontology or synonym database is used to map the identified terms to a term defining what will be characterized as the initial node.

The node assigner 135 assigns the content object to higher-level nodes in initial node's direct path at block 316. The direct path is defined as a shortest path from the initial node at issue to a top level of the hierarchy. In some instances, the content object is assigned to all nodes along the direct path from the initial node to the top level of the hierarchy.

In some instances, multiple hierarchies are applicable to a content object (e.g., due to a service subscribed to by a content provider 105 or client 130 or use of multiple default hierarchies). In these instances, blocks 304-316 are repeated for each applicable hierarchy.

At block 320, the node assigner 135 generates metadata tags including terms that define the nodes to which the content object was assigned at blocks 312-316. The node assigner 135 can then store the content object with the metadata tags in the content-object cache 115.

The metadata query engine 140 searches the content-object cache 115 for content objects with specific metadata tags at block 324. The specific metadata tags can be identified based on, e.g., a query from a user 150, a tag of another content object (such as one being viewed by a user, one that can receive an advertisement content object or an advertisement), an analytics-aggregation criterion set by a client 130 or content provider 105 or a processing-aggregation criterion set by a client 130 or content provider 105.

It will be appreciated that embodiments disclosed herein may be modified, such that—rather than assigning a single content object to multiple nodes in a hierarchy—a search is expanded to search over multiple connected nodes in the hierarchy. Specifically, each content object can be assigned to a single node or set of discrete nodes in the hierarchy. A query node can then be identified based on a search, and secondary query nodes can include all nodes that branch out from the query node. For example, in hierarchy 200, if the query node was "Manchester United" node, the secondary nodes would include the "David de Gea", "Phil Jones" and "Johnny Evans" nodes. Search results would then include content objects assigned to any of these four nodes.

FIGS. 4A-4F show flowcharts of embodiments of processes 400a-400f illustrating how specific metadata tags from block 324 of process 300 can be identified. It will be appreciated that, disclosures of embodiments pertaining to a block in one process can also relate to similar blocks in other processes.

Figure 4A:
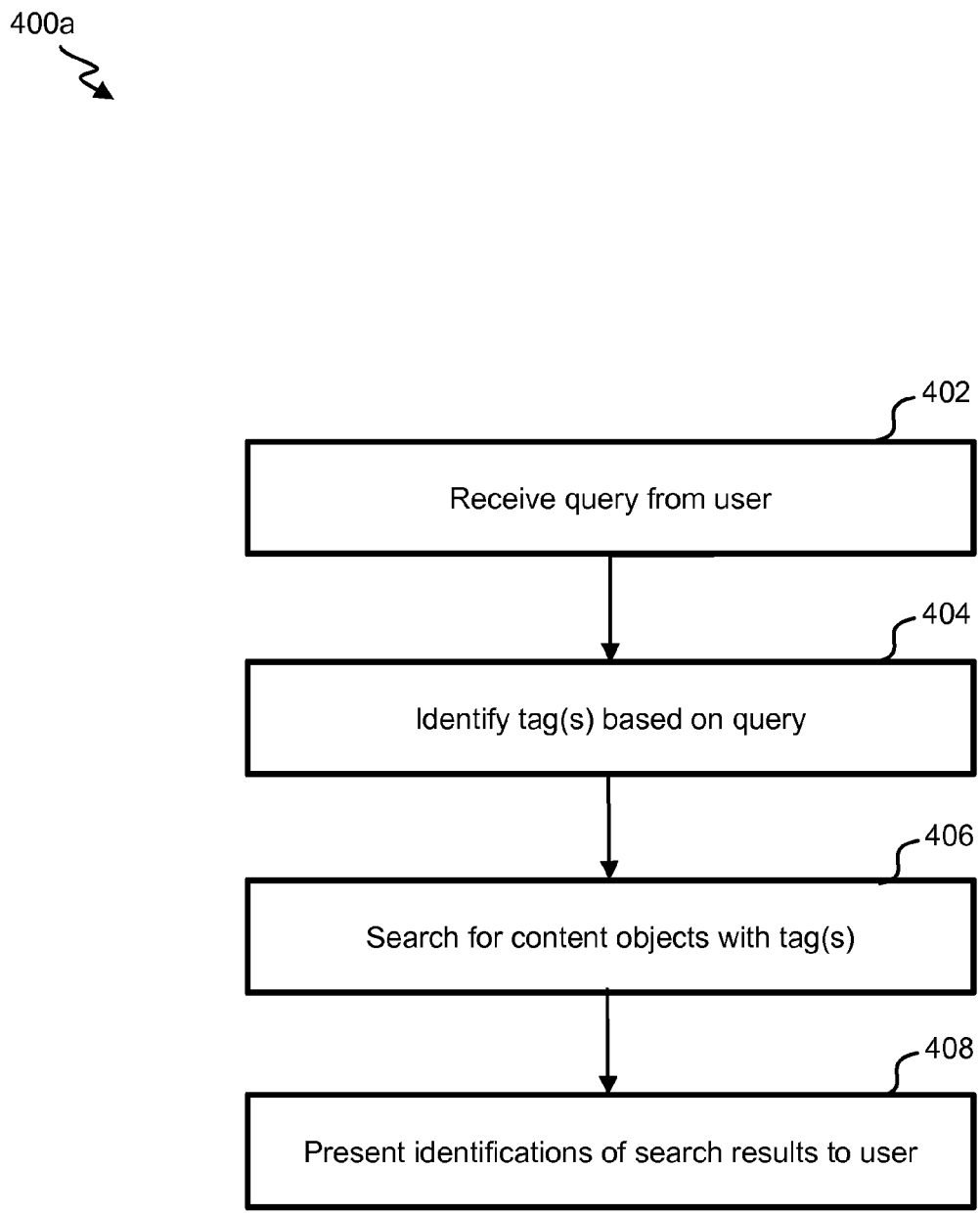
FIGS. 4A-4F illustrate flowcharts of embodiments of processes for identifying specific metadata tags.

In FIG. 4A, process 400a begins at block 402 where the metadata query engine 140 receives a query from a user 150. The user 150 may be using, e.g., an online service that provides (e.g., for a fee or for free) media content, such as videos or television shows, or music content. The query can include one or more terms, such as keywords, an actor's name, a singer's name, a genre and/or a name or partial name of a television show. The query may have been entered by the user 150 into a text box in a web page and/or by selecting one or more options (e.g., presenting category types).

The metadata query engine 140 identifies one or more tags based on the query at block 404. An identified tag can include a term from the query or another term associated with the query term based on an ontology. In some instances, the tags are required to include terms in one or more hierarchies.

The metadata query engine 140 searches for content objects with one, some or all of the identified tag at block 406. The search can be performed by searching metadata associated with each content object in a set of content objects (e.g., in the content-object cache 115). In one instance, the search involves searching metadata included in each content object itself. In one instance, the search involves searching a database including content-object identifiers and corresponding tags but not the content objects themselves. A result of the search can include identifying a single content object, a set of ordered content objects or a set of unordered content objects. The single content object or set of content objects can be identified by, e.g., identifying content objects with an above-threshold or highest number of matches between their tags and the identified tags or by identifying content objects with an above-threshold or highest tag score (computed based on the occurrence of tag matches and weights assigned to the matched tags for an instant content object). If a set of content objects is identified, a number of objects in the set may be fixed (e.g., return the content objects with the 100 highest tag scores) or may depend on how many content objects meet a criterion (e.g., having a tag score above a fixed threshold). The object identification can depend on other non-tag factors, such as price, popularity, size or length and/or a release or broadcast date. If a set of content objects is ordered, the order can be based on, e.g., a number of tag matches or a tag score for each content object in the set.

The metadata query engine 140 presents identifications of the search results to the user 150. For example, a list of the search results can be presented. The presentation can include identifying, for each content object, its name, a description, an icon or screenshot, its fee, its running time, and/or its genre. The presentation can include links, such that the user 150 can request that an identified content object be downloaded or streamed by clicking on one or more links and/or initiating payment of a corresponding fee.

Figure 4B:
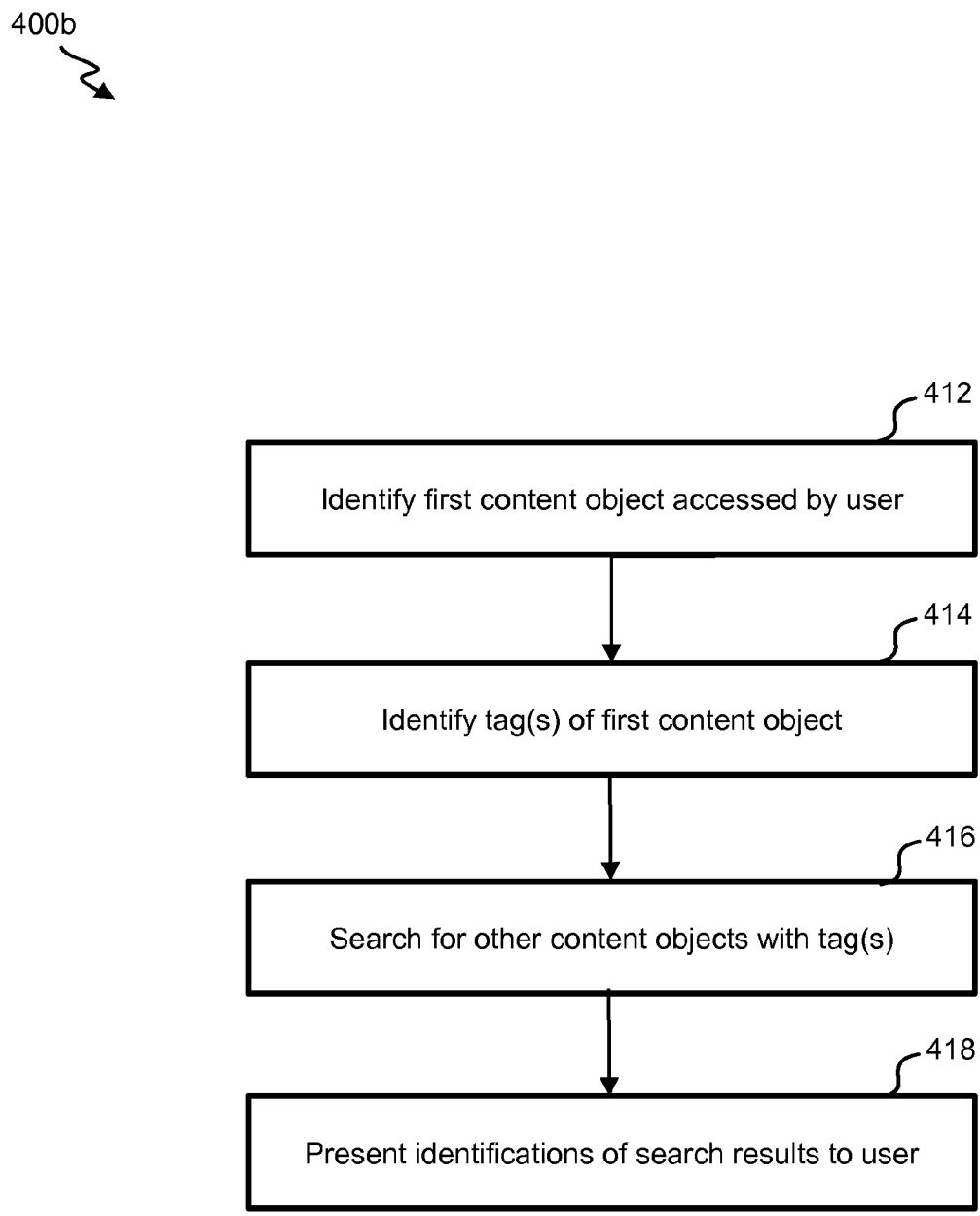

In FIG. 4B, process 400b begins at block 412 where the metadata query engine 140 identifies a first content object accessed by a user 150. The first content object can include one being streamed to a viewer, such as a video and/or audio file. In some instances, the first content object is not currently being accessed by the user 150 but was previously accessed by the user (e.g., via streaming or downloading) or will likely later be accessed by the user. For example, the user may have selected a content object for download.

The metadata query engine 140 identifies one or more tags of the first content object at block 412. For example, the metadata query engine 140 can access the content object and identify the tags based on metadata of the content object. As another example, the metadata query engine 140 can access a database including content-object identifiers and corresponding tag, and look up tags for the first content object. In some instances, the tags can be generated for the first content object, as further described herein.

The metadata query engine 140 searches for content objects with one, some or all of the identified tag at block 416. The metadata query engine 140 presents identifications of search results to user. The results can be presented before, while or after the user 150 is accessing the first content object. For example, a screen shot and name of each search-result content object can be presented around, below, to the side or above a streaming video window on a web page. As another example, identifications of the content objects can be presented in a separate window. This presentation can have an explicit or implicit indication that the search-result content objects are recommended to the user.

Figure 4C:
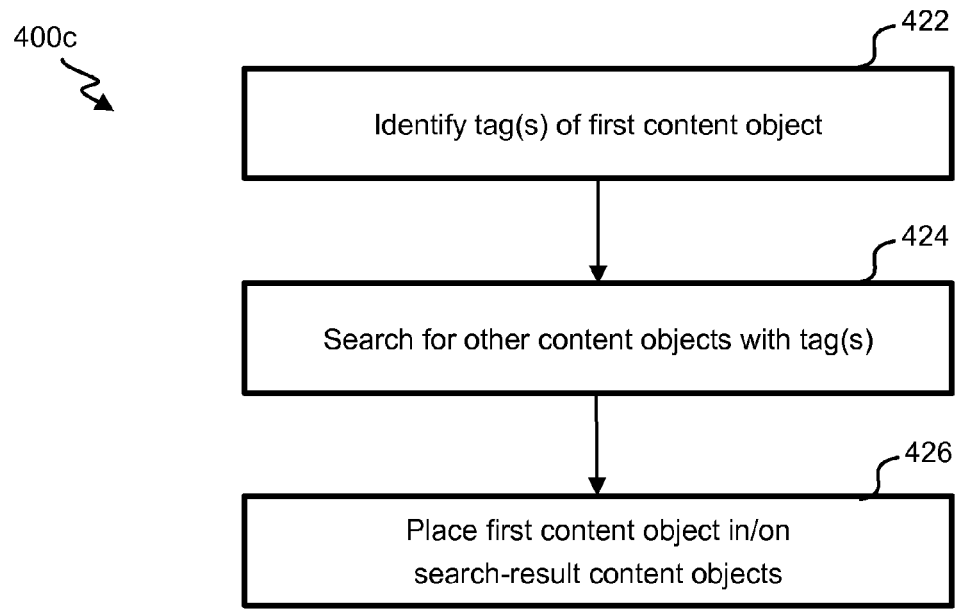

In FIG. 4C, process 400c begins at block 422 where the metadata query engine 140 identifies one or more tags of a first content object. The first content object can include a content object for syndication, such that a provider of the first content object intends for a summary, headline, description, or part or all of the object itself to be presented on a web site (e.g., not provided by the content provider). In some instances, the first content object includes an advertisement content object or a supplemental content object which a provider of the first content object intends to be placed in, on or around another content object. A provider of the first content object may have enrolled in a syndication or placement service. The content placer can identify the one or more tags by reading tags from metadata of the first content object itself, identifying tags associated with the first content object in a database or generating the tags.

The metadata query engine 140 searches for other content objects with one, some or all of the identified tag at block 424. The other content objects may be of a same or different type as the first content object. The search may be restricted to content objects of a particular type (e.g., a type that can be placed in/on the first content object, a same type as the first content object, a type specified by a provider of the first content object, a web page, etc.). For example, a first content object can include or be a video file, and one of the other content objects can include or be a web page.

The content placer 160 places all or part of the first content object in or on the content object(s) identified from the search at block 426. In some instances, a provider of the first content object and/or the other content object(s) must approve the placement prior to its occurrence; in some instances, the placement occurs automatically after block 424. In the syndication context, a summary, headline, screen shot, clip or all of the first content object can be presented on or in each of the other content objects. For example, a live feed or text of the first content object can be presented on one of the other content objects (e.g., a web page). In the advertisement context, e.g., a video first content object can be presented before, during or after a search-result video content object; a text or image first content object can be presented on (e.g., as an overlay) or near (e.g., to a side, beneath or above) a search-result (e.g., video) content object; or a text, image or video first content object can be presented on a search-result webpage content object. In some instances, the content placer 160 itself does not place all or part of the first content object in or on the identified content object(s) but instead assists in the placement.

For example, the content placer 160 may transmit the all or part of the first content object or an integration script (e.g., to provider(s) of the content object(s)) such that the first content object can be placed.

Figure 4D:
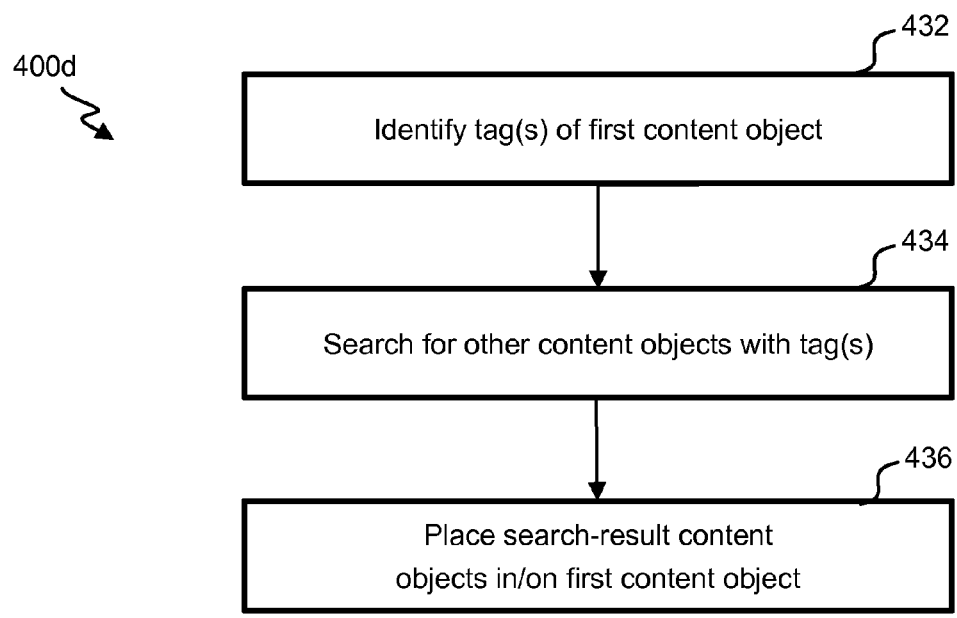

Process 400d of FIG. 4D largely parallels process 400c of FIG. 4C but relates to a first content object that can accept placement of another rather than a first content object to be placed in another. In FIG. 4D, process 400d begins at block 432 where the metadata query engine 140 identifies tag(s) of first content object. The first content object can include, e.g., a webpage or video file.

The metadata query engine 140 searches for other content objects with one, some or all of the identified tags at block 434. The search may be restricted to content objects of a particular type (e.g., a type that can support placement of the first content object, a same type as the first content object, a type specified by a provider of the first content object, an advertisement, a size or length within a particular range or above/below a threshold, etc.). The content placer 160 places the content object(s) identified from the search in or on first content object at block 436.

Figure 4E:
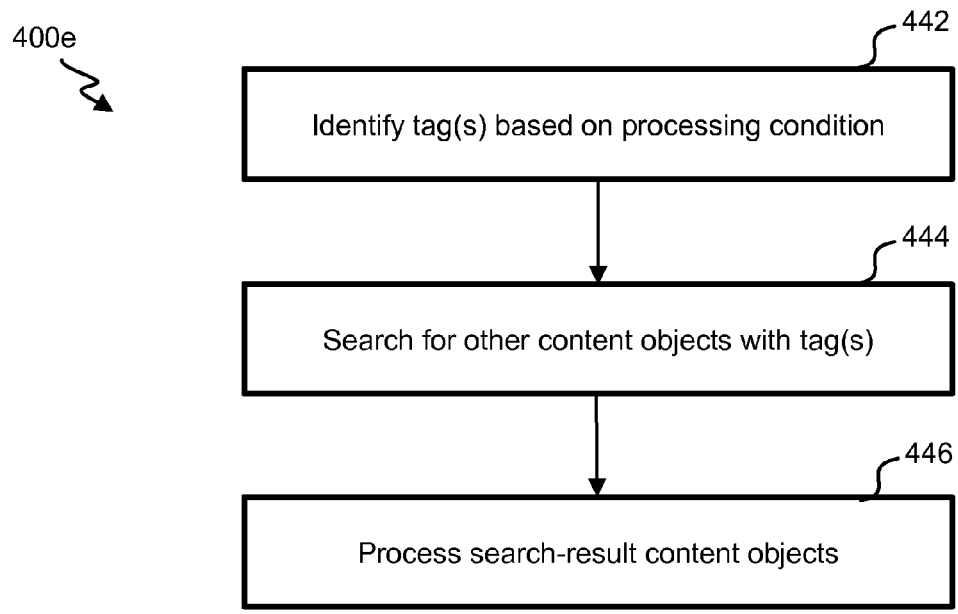

In FIG. 4E, process 400e begins at block 442 where an object-processing engine identifies tag(s) based on processing condition. The processing condition may have been defined by a client 130 or content provider 105. The condition may identify a categorization of content object to receive specific processing. Other conditions may also be identified (such as a file type). For example, a content provider can specify that all documentary videos about culture are to be transcoded into 10 formats and all documentaries about science are to be transcoded into 2 formats. As another example, a content provider can specify that videos are to be cached in specified geographic locations of a CDN based on a categorization of: a language of the content object, a location-tied entity (e.g., a sports team), or genre known or predicted to be popular in specific regions. The processing condition can include one or more terms. The tags can be the same as the terms or can be derived from the terms (e.g., using an ontology).

The metadata query engine 140 searches for content objects with one, some or all of the identified tag at block 444. The search may be constrained to further require, e.g., that the content objects have been provided by a content provider specifying the processing condition or be associated with (e.g., licensed by) a client specifying the processing condition. The object-processing engine 165 processes the content objects identified from the search at block 446.

Figure 4F:
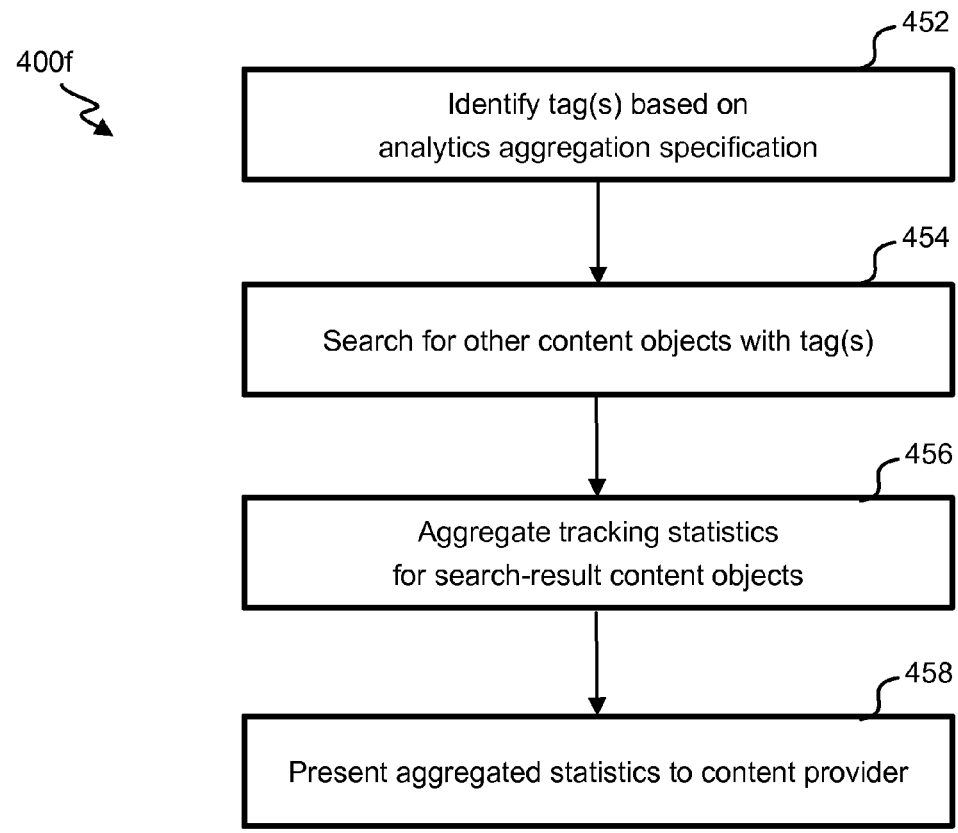

In FIG. 4F, process 400f begins at block 452 where an analytics engine identifies tag(s) based on analytics aggregation specification. The aggregation specification may have been defined by a client 130 or content provider 105. The specification can specify analytics and content-object groupings of interest. For example, the specification can request an average monthly number of views of content objects pertaining to each of a set type of sports category or a distribution of user devices used to view content objects, the distribution being separately calculated based on a type of how-to content (e.g., home improvement, gardening, crafts, cooking, etc.). Each grouping can be defined by one or more terms. The tags can be the same as the terms or can be derived from the terms (e.g., using an ontology).

The metadata query engine 140 searches for content objects with one, some or all of the identified tag at block 454. The analytics engine 170 identifies a tracking statistic for each search-result content object and aggregates the tracking statistics at block 456. The analytics engine 170 presents the aggregated statistics to a content provider or client at block 458. For example, the aggregated statistics can be presented on a webpage, emailed as an electronic document or emailed as email text.

Figure 5:
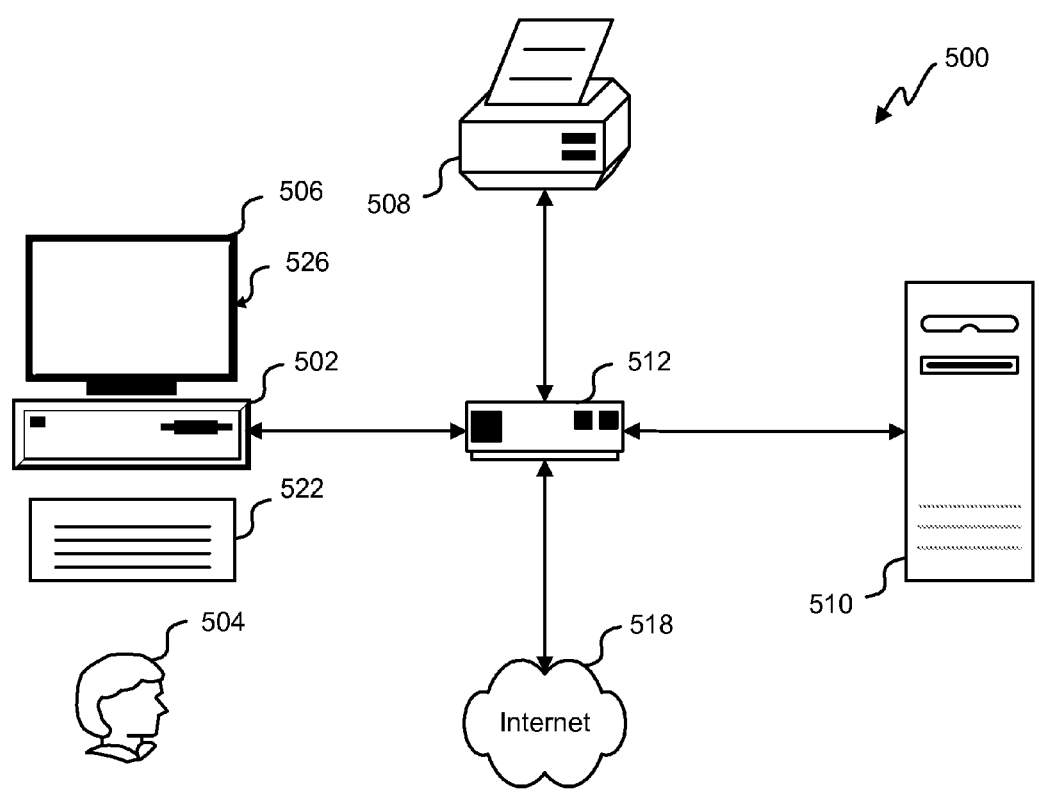
FIG. 5 depicts a block diagram of an embodiment of a computer system.

Referring next to FIG. 5, an exemplary environment with which embodiments may be implemented is shown with a computer system 500 that can be used by a designer 504 to design, for example, electronic designs. The computer system 500 can include a computer 502, keyboard 522, a network router 512, a printer 508, and a monitor 506. The monitor 506, processor 502 and keyboard 522 are part of a computer system 526, which can be a laptop computer, desktop computer, handheld computer, mainframe computer, etc. Monitor 506 can be a CRT, flat screen, etc.

A designer 504 can input commands into computer 502 using various input devices, such as a mouse, keyboard 522, track ball, touch screen, etc. If the computer system 500 comprises a mainframe, a designer 504 can access computer 502 using, for example, a terminal or terminal interface. Additionally, computer system 526 may be connected to a printer 508 and a server 510 using a network router 512, which may connect to the Internet 518 or a WAN.

Server 510 may, for example, be used to store additional software programs and data. In one embodiment, software implementing the systems and methods described herein can be stored on a storage medium in server 510. Thus, the software can be run from the storage medium in server 510. In another embodiment, software implementing the systems and methods described herein can be stored on a storage medium in computer 502. Thus, the software can be run from the storage medium in computer system 526. Therefore, in this embodiment, the software can be used whether or not computer 502 is connected to network router 512. Printer 508 may be connected directly to computer 502, in which case, computer system 526 can print whether or not it is connected to network router 512.

Figure 6:
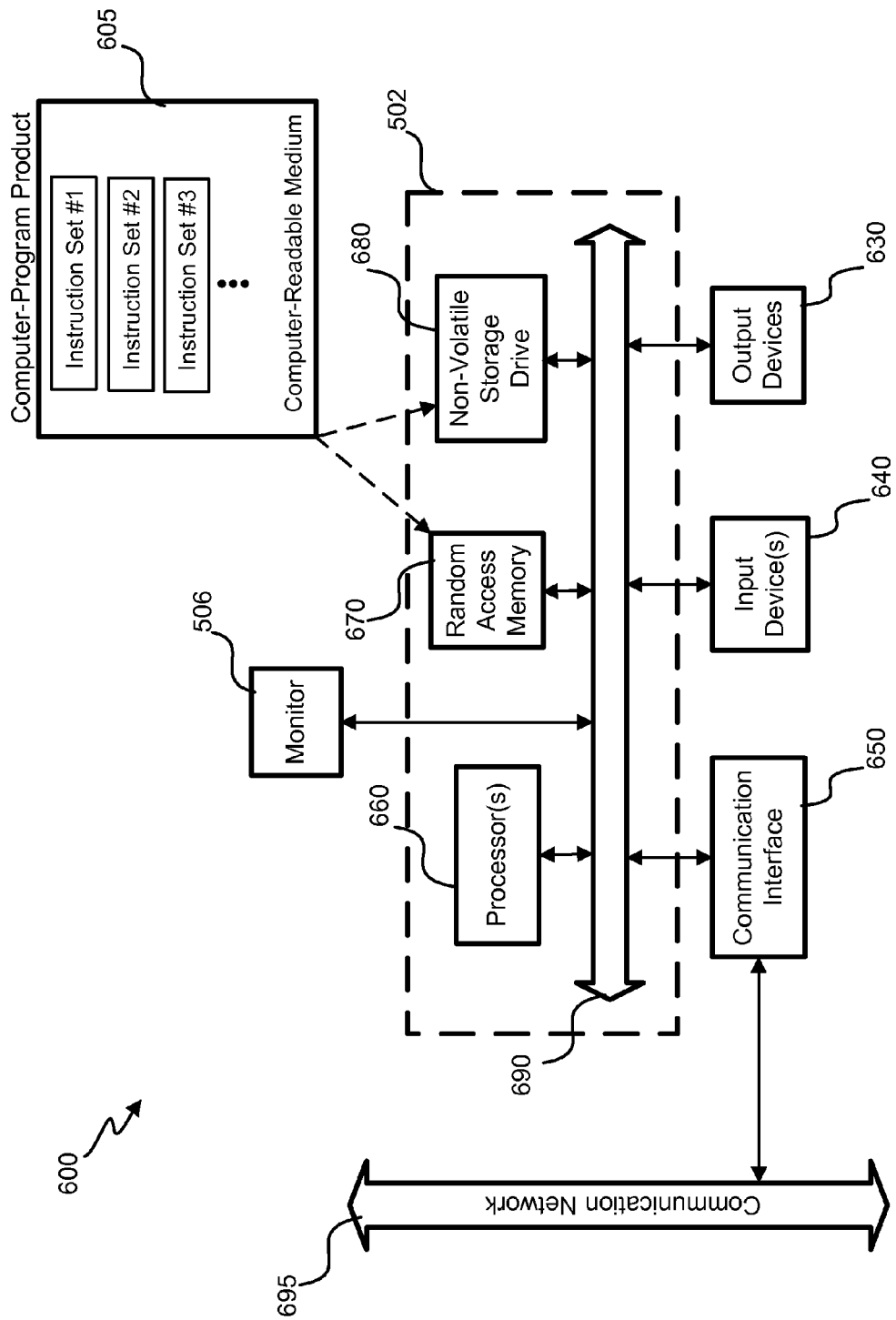
FIG. 6 depicts a block diagram of an embodiment of a special-purpose computer system.

With reference to FIG. 6, an embodiment of a special-purpose computer system 600 is shown. Hierarchy generator 120, node assigner 135 and/or metadata query engine 140 are examples of a special-purpose computer system 600. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 526, it is transformed into the special-purpose computer system 600.

Special-purpose computer system 600 comprises a computer 502, a monitor 506 coupled to computer 502, one or more additional user output devices 630 (optional) coupled to computer 502, one or more user input devices 640 (e.g., keyboard, mouse, track ball, touch screen) coupled to computer 502, an optional communications interface 650 coupled to computer 502, a computer-program product 605 stored in a tangible computer-readable memory in computer 502. Computer-program product 605 directs system 600 to perform the above-described methods. Computer 502 may include one or more processors 660 that communicate with a number of peripheral devices via a bus subsystem 690. These peripheral devices may include user output device(s) 630, user input device(s) 640, communications interface 650, and a storage subsystem, such as random access memory (RAM) 670 and non-volatile storage drive 680 (e.g., disk drive, optical drive, solid state drive), which are forms of tangible computer-readable memory.

Computer-program product 605 may be stored in non-volatile storage drive 690 or another computer-readable medium accessible to computer 502 and loaded into memory 670. Each processor 660 may comprise a microprocessor, such as a microprocessor from Intel® or Advanced Micro Devices, Inc.®, or the like. To support computer-program product 605, the computer 502 runs an operating system that handles the communications of product 605 with the above-noted components, as well as the communications between the above-noted components in support of the computer-program product 605. Exemplary operating systems include Windows® or the like from Microsoft Corporation, Solaris® from Sun Microsystems, LINUX, UNIX, and the like.

User input devices 640 include all possible types of devices and mechanisms to input information to computer system 502. These may include a keyboard, a keypad, a mouse, a scanner, a digital drawing pad, a touch screen incorporated into the display, audio input devices such as voice recognition systems, microphones, and other types of input devices. In various embodiments, user input devices 640 are typically embodied as a computer mouse, a trackball, a track pad, a joystick, wireless remote, a drawing tablet, a voice command system. User input devices 640 typically allow a user to select objects, icons, text and the like that appear on the monitor 506 via a command such as a click of a button or the like. User output devices 630 include all possible types of devices and mechanisms to output information from computer 502. These may include a display (e.g., monitor 506), printers, non-visual displays such as audio output devices, etc.

Communications interface 650 provides an interface to other communication networks and devices and may serve as an interface to receive data from and transmit data to other systems, WANs and/or the Internet 518. Embodiments of communications interface 650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 650 may be coupled to a computer network, to a FireWire® bus, or the like. In other embodiments, communications interface 650 may be physically integrated on the motherboard of computer 502, and/or may be a software program, or the like.

RAM 670 and non-volatile storage drive 680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 670 and non-volatile storage drive 680 may be configured to store the basic programming and data constructs that provide the functionality of various embodiments of the present invention, as described above.

Software instruction sets that provide the functionality of the present invention may be stored in RAM 670 and non-volatile storage drive 680. These instruction sets or code may be executed by processor(s) 660. RAM 670 and non-volatile storage drive 680 may also provide a repository to store data and data structures used in accordance with the present invention. RAM 670 and non-volatile storage drive 680 may include a number of memories including a main random access memory (RAM) to store of instructions and data during program execution and a read-only memory (ROM) in which fixed instructions are stored. RAM 670 and non-volatile storage drive 680 may include a file storage subsystem providing persistent (non-volatile) storage of program and/or data files. RAM 670 and non-volatile storage drive 680 may also include removable storage systems, such as removable flash memory.

Bus subsystem 690 provides a mechanism to allow the various components and subsystems of computer 502 communicate with each other as intended. Although bus subsystem 690 is shown schematically as a single bus, alternative embodiments of the bus subsystem may utilize multiple busses or communication paths within computer 502.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A content delivery system for differentially processing video content objects based on multi-node hierarchy assignments, the system comprising:
 a plurality of points of presence (POPs) distributed geographically in a content delivery network (CDN), the plurality of POPs having a set of caches distributed amongst the plurality of POPs, wherein the set of caches store a plurality of video content objects;
 a hierarchy database including a hierarchy with a plurality of nodes arranged amongst a plurality of levels, wherein:
  each node is defined by a node-defining term,
  each node in a lower level is connected to another node in a higher level,
  the node-defining terms increase in specificity throughout a progression from a highest level to a lowest level, and
  the node-defining terms relate to subject matter of the video content objects;
 a node assigner that, for each video content object of the plurality of video content objects:
  assigns the video content object to a first node in a respective first level in the hierarchy;
  assigns the video content object to a second node in the hierarchy, the second node is at a second level, the second level is higher than the first level, the second node is in a direct path of the first node in the hierarchy, the direct path is defined as a shortest path from the first node to the highest level of the hierarchy;
  generates metadata tags to characterize the video content object, the metadata tags including a first node-defining term defining the first node and a second node-defining term defining the second node; and
  stores the metadata tags;

a metadata query engine that performs a search, from amongst the plurality of video content objects within the set of caches, for a first video content object of the plurality of video content objects that is characterized by the metadata tags; and an object-processing engine that identifies a processing condition, wherein the processing condition specifies a particular geography within the CDN to cache content objects; and a first POP, wherein:
the first POP is within the particular geography of the CDN; and
the first POP caches the first video content object based on the search performed by the metadata query engine and the object-processing engine identifying the processing condition to cache the first video content object within the particular geography.

2. The content delivery system for differentially processing video content objects based on multi-node hierarchy assignments as recited in claim 1, wherein the processing condition is defined by a client.

3. The content delivery system for differentially processing video content objects based on multi-node hierarchy assignments as recited in claim 1, wherein the processing condition conditions a storage disposition for video content objects.

4. The content delivery system for differentially processing video content objects based on multi-node hierarchy assignments as recited in claim 1, wherein, upon the node assigner assigning the video content object to the first node, the video content object is immediately and automatically assigned to the second node.

5. The content delivery system for differentially processing video content objects based on multi-node hierarchy assignments as recited in claim 1, wherein the assignment of the video content object to the first node is based on input provided by a provider of the video content object.

6. The content delivery system for differentially processing video content objects based on multi-node hierarchy assignments as recited in claim 1, wherein the assignment of the video content object to the first node is based on a transcript of an audio track of the video content object.

7. The content delivery system for differentially processing video content objects based on multi-node hierarchy assignments as recited in claim 1, further comprising a hierarchy generator that generates the hierarchy based on input from a client.

8. A method for differentially processing video content objects based on multi-node hierarchy assignments, the method comprising:
accessing a first video content object from a set of caches distributed amongst a plurality of points of presence (POPs) within a content delivery network (CDN), wherein:
the plurality of POPs are distributed geographically,
the set of caches store a plurality of video content objects, and
the first video content object is selected from the plurality of video content objects;
accessing a hierarchy with a plurality of nodes arranged amongst a plurality of levels, wherein:
each node is defined by a node-defining term,
each node in a lower level is connected to another node in a higher level,
the node-defining terms increase in specificity throughout a progression from a highest level to a lowest level, and
the node-defining terms relate to subject matter for a video content object;
assigning the first video content object to a first node in a respective first level in the hierarchy;
assigning the first video content object to a second node in the hierarchy based on the assignment to the first node, the second node is at a second level, the second level is higher than the first level, the second node is in a first direct path of the first node in the hierarchy, the first direct path is defined as a shortest path from the first node to the highest level of the hierarchy;
generating first and second metadata tags to characterize the first video content object, the first metadata tag including a first node-defining term defining the first node and the second metadata tag including a second node-defining term defining the second node;
storing the first and second metadata tags;
accessing a second video content object from the set of caches distributed amongst the plurality of POPs;
assigning the second video content object to a third node in a respective third level in the hierarchy, the third node is different than the first node and different than the second node, the second level is higher than the third level;
assigning the second video content object to the second node in the hierarchy based on the assignment to the third node, the second node is in a second direct path of the third node in the hierarchy, the second direct path is defined as a shortest path from the third node to the highest level of the hierarchy;
generating third and fourth metadata tags to characterize the second video content object, the third metadata tag including a third node-defining term defining the third node and the fourth metadata tag including the second node-defining term defining the second node;
storing the third and fourth metadata tags;
identifying a query tag, wherein:
the query tag includes a processing condition,
the processing condition specifies a particular geography of the CDN to cache content objects, and
the query tag includes the first node-defining term;
searching from amongst the plurality of video content objects within the set of caches for video content objects characterized by the first node-defining term;
determining that the first video content object is characterized by the query tag based on the stored first metadata tag; and
processing the first video content object by caching the first video content object in a first POP of the plurality of POPs, wherein:
the first POP is within the particular geography of the CDN; and
the first POP caches the first video content object based on the determining that the first video content object is characterized by the query tag and the processing condition specifying the particular geography.

9. The method for differentially processing video content objects based on multi-node hierarchy assignments as recited in claim 8, wherein the processing condition is defined by a client.

10. The method for differentially processing video content objects based on multi-node hierarchy assignments as recited in claim 8, wherein the processing condition conditions a storage disposition for video content objects.

11. The method for differentially processing video content objects based on multi-node hierarchy assignments as recited in claim 8, wherein, upon the assignment of the first video content object to the first node, the first video content object is immediately and automatically assigned to the second node.

12. The method for differentially processing video content objects based on multi-node hierarchy assignments as recited in claim 8, wherein the assignment of the first video content object to the first node is based on input provided by a provider of the first video content object.

13. The method for differentially processing video content objects based on multi-node hierarchy assignments as recited in claim 8, wherein the first video content object and the second video content object are provided by a same content provider.

14. The method for differentially processing video content objects based on multi-node hierarchy assignments as recited in claim 8, wherein the hierarchy is defined based on input from a client.

15. A method for differentially processing video content objects based on multi-node hierarchy assignments, the method comprising:
    accessing a set of video content objects from a set of caches distributed amongst a plurality of points of presence (POPs) within a content delivery network (CDN), wherein:
        the plurality of POPs are distributed geographically, and the set of caches store the set of video content objects;
    accessing a hierarchy with a plurality of nodes arranged amongst a plurality of levels, wherein:
        each node is defined by a node-defining term,
        each node in a lower level is connected to another node in a higher level,
        the node-defining terms increase in specificity throughout a progression from a highest level to a lowest level, and
        the node-defining terms relate to subject matter for a video content object of the set of video content objects;
    for each video content object of the set of video content objects:
        assigning the video content object to a respective first node in the hierarchy;
        identifying a direct path for the video content object, the direct path is a shortest path from the respective first node to the highest level of the hierarchy;
        assigning the video content object to a respective second node in the direct path;
        generating respective first and second metadata tags to characterize the video content object, the respective first metadata tag including a first node-defining term defining the respective first node and the respective second metadata tag including a second node-defining term defining the respective second node; and
        storing the respective first and second metadata tags to indicate that the video content object is characterized by the first and second metadata tags;
    identifying a query tag, wherein:
        the query tag includes a processing condition,
        the processing condition specifies a particular geography of the CDN to cache content objects, and
        the query tag includes a node-defining term;
    searching from amongst the set of video content objects within the set of caches for video content objects characterized by the first node-defining term;
    selecting a first subset of video content objects from the set of video content objects that are characterized by the query tags, the selection is based on the stored first and second metadata tags; and
    processing each video content object of the first subset of video content objects by caching the first subset of video content objects in a first point POP of the plurality of POPs, wherein:
        the first POP is within the particular geography of the CDN; and
        the first POP caches the first subset of video content objects based on the first subset of video content objects being characterized by the query tag and the processing condition specifying the particular geography.

16. The method for differentially processing video content objects based on multi-node hierarchy assignments as recited in claim 15, wherein the processing condition is defined by a client.

17. The method for differentially processing video content objects based on multi-node hierarchy assignments as recited in claim 15, wherein the processing condition conditions a storage disposition for video content objects.

18. The method for differentially processing video content objects based on multi-node hierarchy assignments as recited in claim 15, wherein, for each video content object of the set of video content objects, upon the assignment of the video content object to the respective first node, the video content object is immediately and automatically assigned to the respective second node.

19. The method for differentially processing video content objects based on multi-node hierarchy assignments as recited in claim 15, wherein the assignment of the video content object to the first node is based on input provided by a provider of the video content object.

20. The method for differentially processing video content objects based on multi-node hierarchy assignments as recited in claim 15, wherein the hierarchy is defined based on input from a client.

* * * * *